US011740371B2

(12) United States Patent
Chen et al.

(10) Patent No.: US 11,740,371 B2
(45) Date of Patent: Aug. 29, 2023

(54) DEVICE AND METHOD FOR MEASURING DYNAMIC EVOLUTION OF THREE-DIMENSIONAL DISTURBED STRESS UNDER MINING DISTURBANCE

(71) Applicant: Institute of Rock and Soil Mechanics, Chinese Academy of Sciences, Hubei (CN)

(72) Inventors: Bingrui Chen, Hubei (CN); Tao Li, Hubei (CN); Fanbo Wei, Hubei (CN); Xinhao Zhu, Hubei (CN); Bo Wang, Hubei (CN)

(73) Assignee: Institute of Rock and Soil Mechanics, Chinese Academy of Sciences, Wuhan (CN)

(*) Notice: Subject to any disclaimer, the term of this patent is extended or adjusted under 35 U.S.C. 154(b) by 935 days.

(21) Appl. No.: 16/531,050

(22) Filed: Aug. 3, 2019

(65) Prior Publication Data
US 2020/0116023 A1    Apr. 16, 2020

(30) Foreign Application Priority Data
Oct. 10, 2018  (CN) .......................... 201811178846.9

(51) Int. Cl.
*G01V 1/16* (2006.01)
*G01V 1/52* (2006.01)
(Continued)

(52) U.S. Cl.
CPC .............. *G01V 1/16* (2013.01); *G01L 5/0004* (2013.01); *G01L 5/16* (2013.01); *G01V 1/52* (2013.01);
(Continued)

(58) Field of Classification Search
CPC ...... G01V 1/16; G01V 1/52; G01V 2001/526; G01L 5/0004; G01L 5/16
See application file for complete search history.

(56) References Cited

U.S. PATENT DOCUMENTS 6,049,508 A * 4/2000 Deflandre ................ G01V 1/42
                                                      181/112
9,835,017 B2 * 12/2017 Taylor ...................... G01V 1/42
(Continued)

FOREIGN PATENT DOCUMENTS

CN          101008565 A       8/2007
CN          103175989 A       6/2013
(Continued)

*Primary Examiner* — Ian J Lobo

(57) ABSTRACT

The present invention discloses a device for measuring dynamic evolution of a three-dimensional disturbed stress under mining disturbance, comprising an outer steel cylinder. Three three-direction sensing units are arranged on the outer steel cylinder. Any two of three stress measurement directions of each three-direction sensing unit are perpendicular to each other. Nine stress measurement directions of the three three-direction sensing units are different. The present invention also discloses a method for measuring dynamic evolution of a three-dimensional disturbed stress under mining disturbance. In the present invention, stresses are measured from three perpendicular directions which are inclined, so the difficulty in measuring a three-dimensional stress in a borehole is overcome; and a spatial stress value is measured by three three-direction sensing units, and thus the size and direction of a disturbed principal stress in the borehole are calculated.

2 Claims, 6 Drawing Sheets

(51) Int. Cl.
*G01L 5/16* (2020.01)
*G01L 5/00* (2006.01)
*E21F 17/18* (2006.01)
*G01V 1/48* (2006.01)

(52) U.S. Cl.
CPC ............... *E21F 17/18* (2013.01); *G01V 1/48* (2013.01); *G01V 2001/526* (2013.01)

(56) References Cited

U.S. PATENT DOCUMENTS

2006/0023567 A1\* 2/2006 Uhl .................... G01V 1/40
 367/13
2008/0264183 A1 10/2008 Graham et al.

FOREIGN PATENT DOCUMENTS

| | | | | |
|---|---|---|---|---|
| CN | 104390733 A | 3/2015 | | |
| EP | 2960679 A2 \* | 12/2015 | ............. | G01V 1/162 |
| JP | H11258085 A | 9/1999 | | |
| WO | WO-2017114517 A1 \* | 7/2017 | ............. | G01N 25/16 |

\* cited by examiner

DEVICE AND METHOD FOR MEASURING DYNAMIC EVOLUTION OF THREE-DIMENSIONAL DISTURBED STRESS UNDER MINING DISTURBANCE

CROSS-REFERENCE TO RELATED APPLICATIONS

This application claims the benefit of priority from Chinese Patent Application No. CN201811178846.9, filed on Oct. 10, 2018. The content of the aforementioned application, including any intervening amendments thereto, is incorporated herein by reference in its entirety.

TECHNICAL FIELD

The present invention relates to the field of micro-seismic monitoring and in particular to a device and method for measuring dynamic evolution of a three-dimensional disturbed stress under mining disturbance, applicable to safety monitoring, assessment and management of engineering disasters, such as rock burst, roof collapse, ground pressure compact, landslide and earthquake, which are induced by mining (coal mines and non-coal mines), oil-gas field development, water conservancy and hydropower and road construction, reservoir filling, nuclear waste storage, geologic sequestration of greenhouse gas, exploitation of seabed resources, and national defense construction.

BACKGROUND OF THE PRESENT INVENTION

Geotechnical engineering disasters are usually caused by the change in the stress field of the engineering system due to the disturbance or influence of external changes such as excavation/exploitation. However, how the stress changes, how its size evolves, and how its direction rotates are still hot and difficult issues of research. To this end, a number of stress monitoring equipment and devices have been invented. But, further studies indicated that the existing stress monitoring equipment still has the following deficiencies that need further improvement and enhancement.

1) As the stress direction monitored by the existing borehole monitoring device, the direction of the borehole axis or the direction of the cross section are included. Usually, the linear or planar stress is monitored. The measured stress reflects only the one-dimensional and two-dimensional disturbance at this point, rather than the spatial disturbance in boreholes.

2) For existing borehole monitoring devices, monitoring the evolution of the size and direction of the principal stress of the disturbed stresses is rarely taken into consideration.

3) The existing borehole monitoring device is usually used to measure the displacement and strain characteristics of the borehole, and then the stress of the wall rocks is calculated according to the elastic constant of the surrounding rocks. However, since the couplants, rocks and elastic housing materials have different elastic constant and coupling mass, there is a great error between the calculated stress and the actual stress.

SUMMARY OF THE PRESENT INVENTION

In view of the problems in the prior art, an objective of the present invention is to provide a device and method for measuring dynamic evolution of a three-dimensional disturbed stress under mining disturbance. By the device and method of the present invention, the change in the size and direction of a stress under engineering excavation/exploitation disturbance can be monitored, with the advantages of simple structure, small volume, high sensitivity, and low influence to the on-site construction environment.

The objective of the present invention is realized by the following technical solutions.

The present invention discloses a device for measuring dynamic evolution of a three-dimensional disturbed stress under mining disturbance, comprising an outer steel cylinder. Three three-direction sensing units are arranged on the outer steel cylinder. Any two of three stress measurement directions of each three-direction sensing unit are perpendicular to each other. Nine stress measurement directions of the three three-direction sensing units are different.

The three-direction sensing unit comprises an equivalent modulus housing disposed inside the outer steel cylinder; a cubic holder is disposed in the center of the equivalent modulus housing; a rectangular slot is formed in the center of each face of the cubic holder, with the edge of the rectangular slot being connected to a fixed end of a spring steel; a free end of the spring steel is located in the center of the rectangular slot; strain gauges are disposed on two faces, close to the fixed end, of the spring steel; the free end of the spring steel is connected to a transmission head at an inner end of a transmission rod; the inner end of the transmission rod is connected to a threaded through hole on the equivalent modulus housing, and an outer end of the transmission rod passes through the outer steel cylinder and is located outside the outer steel cylinder; and the transmission rods corresponding to two opposite faces of the cubic holder are coaxial and the axial direction is the stress measurement direction.

A mounting trough is formed on the outer steel cylinder, a transmission rod mount is disposed in the mounting trough, the transmission rod passes through the transmission rod mount, and an elastic sealing ring is disposed between the transmission rod and an inner wall of the mounting trough.

The present invention discloses a method for measuring dynamic evolution of three-dimensional disturbed stress under mining disturbance, comprising steps of:

S1: establishing a basic coordinate system, the basic coordinate system having an X-axis that is an axis of the outer steel cylinder, and a Y-axis and a Z-axis which are perpendicular to each other and are in a plane perpendicular to the axis of the outer steel cylinder, the axis of the outer steel cylinder being coincident with an axis of a borehole, the X-axis and the Y-axis of the basic coordinate system being in a horizontal plane;

S2: according to the right-hand screw rule, rotating the X-axis, Y-axis and Z-axis of the basic coordinate system successively by an angle $\alpha$, $\beta$ and $\gamma$ to obtain a first transformed coordinate system, with three axes of the first transformed coordinate system being defined as X'-axis, Y'-axis and Z'-axis, three stress measurement directions of the first three-direction sensing unit on the outer steel cylinder being an X'-axis direction, a Y'-axis direction and a Z'-axis direction, respectively, rotating the X-axis, Y-axis and Z-axis of the basic coordinate system successively by an angle $\zeta$, $\eta$ and $\theta$ to obtain a second transformed coordinate system, with three axes of the second transformed coordinate system being defined as X''-axis, Y''-axis and Z''-axis, three stress measurement directions of the second three-direction sensing unit on the outer steel cylinder being an X''-axis direction, a Y''-axis direction and a Z''-axis direction, respectively, rotating the X-axis, Y-axis and Z-axis of the basic coordinate system successively by an angle φ, ω and ψ to obtain a third transformed coordinate system, with three axes of the third transformed coordinate system being defined as X'''-axis, Y'''-axis and Z'''-axis, three stress measurement directions of the third three-direction sensing unit on the outer steel cylinder (2) being an X'''-axis direction, a Y'''-axis direction and a Z'''-axis direction, respectively; and S3: obtaining, by the three three-direction sensing units on the outer steel cylinder (2), stresses in the X'-axis direction, the Y'-axis direction and the Z'-axis direction of the first transformed coordinate system, respectively denoted by $\sigma_x'$, $\sigma_y'$, $\sigma_z'$, stresses in the X''-axis direction, the Y''-axis direction and the Z''-axis direction of the second transformed coordinate system, respectively denoted by $\sigma_x''$, $\sigma_y''$, $\sigma_z''$, and stresses in the X'''-axis direction, the Y'''-axis direction and the Z'''-axis direction of the third transformed coordinate system, respectively denoted by $\sigma_x'''$, $\sigma_y'''$, $\sigma_z'''$, setting the stress in a basic state in the basic coordinate system as:

$$\begin{pmatrix} \sigma_x & \tau_{yx} & \tau_{zx} \\ \tau_{xy} & \sigma_y & \tau_{zy} \\ \tau_{xz} & \tau_{yz} & \sigma_z \end{pmatrix},$$

where $\tau_{yx}$ and $\tau_{xy}$ have a same value, $\tau_{zx}$ and $\tau_{xz}$ have a same value, $\tau_{zy}$ and $\tau_{yz}$ have a same value, calculating, by iteration, the stress in the basic state according to equations 1, 2 and 3:

$$\begin{pmatrix} \sigma_x' \\ \sigma_y' \\ \sigma_z' \end{pmatrix} = \begin{pmatrix} \cos\gamma & \sin\gamma & 0 \\ -\sin\gamma & \cos\gamma & 0 \\ 0 & 0 & 1 \end{pmatrix}$$
$$\begin{pmatrix} \cos\beta & 0 & -\sin\beta \\ 0 & 1 & 0 \\ \sin\beta & 0 & \cos\beta \end{pmatrix} \begin{pmatrix} 1 & 0 & 0 \\ 0 & \cos\alpha & \sin\alpha \\ 0 & -\sin\alpha & \cos\alpha \end{pmatrix} \begin{pmatrix} \sigma_x & \tau_{yx} & \tau_{zx} \\ \tau_{xy} & \sigma_y & \tau_{zy} \\ \tau_{xz} & \tau_{yz} & \sigma_z \end{pmatrix}$$

Equation 1

$$\begin{pmatrix} \sigma_x'' \\ \sigma_y'' \\ \sigma_z'' \end{pmatrix} = \begin{pmatrix} \cos\theta & \sin\theta & 0 \\ -\sin\theta & \cos\theta & 0 \\ 0 & 0 & 1 \end{pmatrix}$$
$$\begin{pmatrix} \cos\eta & 0 & -\sin\eta \\ 0 & 1 & 0 \\ \sin\eta & 0 & \cos\eta \end{pmatrix} \begin{pmatrix} 1 & 0 & 0 \\ 0 & \cos\zeta & \sin\zeta \\ 0 & -\sin\zeta & \cos\zeta \end{pmatrix} \begin{pmatrix} \sigma_x & \tau_{yx} & \tau_{zx} \\ \tau_{xy} & \sigma_y & \tau_{zy} \\ \tau_{xz} & \tau_{yz} & \sigma_z \end{pmatrix}$$

Equation 2

$$\begin{pmatrix} \sigma_x''' \\ \sigma_y''' \\ \sigma_z''' \end{pmatrix} = \begin{pmatrix} \cos\varphi & \sin\varphi & 0 \\ -\sin\varphi & \cos\varphi & 0 \\ 0 & 0 & 1 \end{pmatrix}$$
$$\begin{pmatrix} \cos\omega & 0 & -\sin\omega \\ 0 & 1 & 0 \\ \sin\omega & 0 & \cos\omega \end{pmatrix} \begin{pmatrix} 1 & 0 & 0 \\ 0 & \cos\psi & \sin\psi \\ 0 & -\sin\psi & \cos\psi \end{pmatrix} \begin{pmatrix} \sigma_x & \tau_{yx} & \tau_{zx} \\ \tau_{xy} & \sigma_y & \tau_{zy} \\ \tau_{xz} & \tau_{yz} & \sigma_z \end{pmatrix}$$

Equation 3

The method further comprises a step S4:

obtaining an equation for a principal stress, indicated by Equation 4, by setting a normal direction of a principal stress plane in the basic coordinate system as (l, m, n) and a principal stress as σ:

$(\sigma_x - \sigma)l + \tau_{yx}m + \tau_{zx}n = 0$ $\tau_{xy}l + (\sigma_y - \sigma)m + \tau_{zy}n = 0$ $\tau_{xz}l + \tau_{yz}m + (\sigma_z - \sigma)n = 0$  Equation 4 and obtaining the normal direction of the principal stress plane $l^2 + m^2 + n^2 = 1$ and the principal stress σ according to (l, m, n) and Equation 4.

Rotating the X-axis, Y-axis and Z-axis of the basic coordinate system successively by an angle α, β and γ to obtain a first transformed coordinate system comprises steps of:

rotating the X-axis of the basic coordinate system for the first time, that is, by using the X-axis of the basic coordinate system as a rotation axis, with the right thumb indicating the positive direction of the X-axis of the basic coordinate system, rotating by an angle α toward a direction indicated by the remaining four fingers; rotating the Y-axis of the basic coordinate system for the first time, the X-axis of which has been rotated for the first time, that is, by using the Y-axis of the basic coordinate system as a rotation axis, with the right thumb indicating the positive direction of the Y-axis of the basic coordinate system, rotating by an angle β toward a direction indicated by the remaining four fingers; rotating the Z-axis of the basic coordinate system for the first time, the X-axis and the Y-axis of which have been rotated for the first time, that is, by using the Z-axis of the basic coordinate system as a rotation axis, with the right thumb indicating the positive direction of the Z-axis of the basic coordinate system, rotating by an angle γ toward a direction indicated by the remaining four fingers, to obtain a first transformed coordinate system;

rotating the X-axis, Y-axis and Z-axis of the basic coordinate system successively by an angle ζ, η and θ to obtain a second transformed coordinate system comprises steps of:

rotating the X-axis of the basic coordinate system for the second time, that is, by using the X-axis of the basic coordinate system as a rotation axis, with the right thumb indicating the positive direction of the X-axis of the basic coordinate system, rotating by an angle γ toward a direction indicated by the remaining four fingers; rotating the Y-axis of the basic coordinate system for the second time, the X-axis of which has been rotated for the second time, that is, by using the Y-axis of the basic coordinate system as a rotation axis, with the right thumb indicating the positive direction of the Y-axis of the basic coordinate system, rotating by an angle η toward a direction indicated by the remaining four fingers; rotating the Z-axis of the basic coordinate system for the second time, the X-axis and the Y-axis of which have been rotated for the second time, that is, by using the Z-axis of the basic coordinate system as a rotation axis, with the right thumb indicating the positive direction of the Z-axis of the basic coordinate system, rotating by an angle θ toward a direction indicated by the remaining four fingers, to obtain a second transformed coordinate system; and in S2, rotating the X-axis, Y-axis and Z-axis of the basic coordinate system successively by an angle φ, ω and ψ to obtain a third transformed coordinate system comprises steps of:

rotating the X-axis of the basic coordinate system for the third time, that is, by using the X-axis of the basic coordinate system as a rotation axis, with the right thumb indicating the positive direction of the X-axis of the basic coordinate system, rotating by an angle φ toward a direction indicated by the remaining four fingers; rotating the Y-axis of the basic coordinate system for the third time, the X-axis of which has been rotated for the third time, that is, by using the Y-axis of the basic coordinate system as a rotation axis, with the right thumb indicating the positive direction of the Y-axis of the basic coordinate system, rotating by an angle ω toward a direction indicated by the remaining four fingers; rotating the Z-axis of the basic coordinate system for the third time, the X-axis and the Y-axis of which have been rotated for the third time, that is, by using the Z-axis of the basic coordinate system as a rotation axis, with the right thumb indicating the positive direction of the Z-axis of the basic coordinate system, rotating by an angle ψ toward a direction indicated by the remaining four fingers, to obtain a third transformed coordinate system.

Calculating stresses in the stress measurement directions of the three-direction sensing unit comprises steps of:

S3.1: measuring and recording stress-strain corresponding curves for four strain gauges in a same stress measurement direction;

S3.2: obtaining, according to strains monitored by the four strain gauges and from the stress-strain corresponding curves, corresponding stresses respectively defined as $\sigma_1$, $\sigma_2$, $\sigma_3$ and $\sigma_4$, sorting the stresses obtained by the four strain gauges from lowest to highest, $\sigma_1 \geq \sigma_2 \geq \sigma_3 \geq \sigma_4$, and, regarding bias the stress in the stress measurement directions if $\sigma_1$, $\sigma_2$, $\sigma_3$ and $\sigma_4$ are equal, otherwise, proceeding to S3.3;

S3.3: calculating an average value $\bar{\sigma}$ of $\sigma_1$, $\sigma_2$, $\sigma_3$ and $\sigma_4$, and a standard deviation s;

S3.4: calculating a difference $\bar{\sigma}$ between the average value $\sigma_1$ and the minimum value $\sigma_1$, and a difference $\bar{\sigma} - \sigma_1$ between the maximum value $\sigma_4$ and the average value $\sigma_4$;

S3.5: determining a dubious value: comparing $\bar{\sigma} - \sigma_1$ with $\sigma_4 - \bar{\sigma}$, determining $\sigma_1$ as the dubious value if $\bar{\sigma} - \sigma_1$ is greater than $\sigma_4 - \bar{\sigma}$, determining $\sigma_4$ as the dubious value if $\sigma_1$ is greater than $\sigma_4 - \bar{\sigma}$, and selecting one of $\sigma_1$ and $\sigma_4$ as the dubious value if $\bar{\sigma} - \sigma_1$ is equal to $\sigma_4$;

S3.6: calculating the G value of the dubious value, G=(dubious value$-\bar{\sigma}$)/s;

S3.7: setting a confidence probability and obtaining a critical value from the Grubbs table according to the number of stresses in a same stress measurement direction and the confidence probability; and S3.8: comparing the G value of the dubious value and the critical value, if the G value of the dubious value is greater than the critical value, determining the dubious value as an abnormal value, eliminating the dubious value, and calculating an average value of the remaining three stresses in the same stress measurement direction to obtain the stress in this stress measurement direction, otherwise calculating an average value of the measured four stresses to obtain the stress in this stress measurement direction.

Compared with the prior art, the present invention has the following advantages:

1. in the present invention, stresses are measured from three perpendicular directions which are inclined, so the difficulty in measuring a three-dimensional stress in a borehole is overcome;

2. in the present invention, a spatial stress value is measured by three three-direction sensing units, and thus the size and direction of a disturbed principal stress in the borehole are calculated; and 3. in the present invention, the displacement of a bent section of a spring steel is derived from the strain measured by a strain gauge, the thrust on a transmission rod is further obtained, and thus the pressure of wall rocks is obtained. Errors caused by inaccurate measurement of moduli of elasticity of concrete and wall rocks are avoided.

BRIEF DESCRIPTION OF THE DRAWINGS

FIG. 9 is a structure diagram of one face of the cubic holder, in which:

Figure 1:
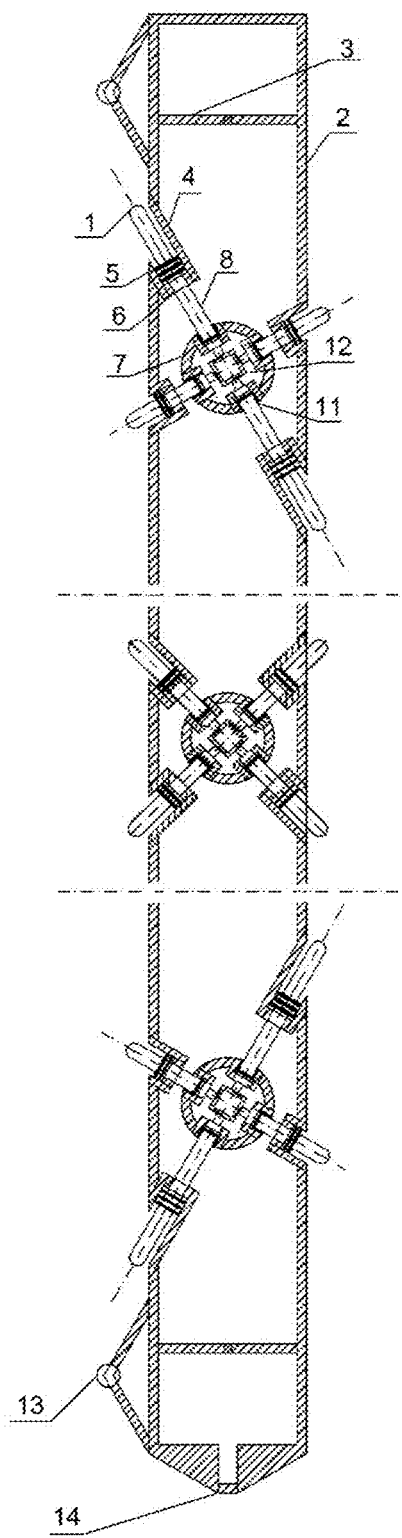
FIG. 1 is a sectional structure diagram of the present invention.

1: transmission rod head; 2: steel cylinder; 3: limiting block; 4: mounting trough; 5: elastic sealing ring; 6: transmission rod mount; 7: equivalent modulus housing; 8: transmission rod; 9: strain gauge; 10: spring steel; 11: threaded through hole; 12: cubic holder; 13: collision prevention pulley; 14: line outlet; 15: rectangular slot; and 16: transmission head.

DETAILED DESCRIPTION OF THE PRESENT INVENTION

To be convenient for a person of ordinary skill in the art to understand and implement the present invention, the present invention will be further described in detail by embodiments. It should be understood that the implementation examples to be described below are merely used for describing and explaining the present invention, rather than limiting the present invention.

The present invention discloses a device for measuring dynamic evolution of a three-dimensional disturbed stress under mining disturbance, comprising an outer steel cylinder 2, wherein three three-direction sensing units are arranged on the outer steel cylinder 2, any two of three stress measurement directions of each three-direction sensing unit are perpendicular to each other, and nine stress measurement directions of the three three-direction sensing units are different.

The three-direction sensing unit comprises an equivalent modulus housing 7 disposed inside the outer steel cylinder 2; a cubic holder 12 is disposed in the center of the equivalent modulus housing 7; a rectangular slot 15 is formed in the center of each face of the cubic holder 12, with the edge of the rectangular slot 15 being connected to a fixed end of a spring steel 10; a free end of the spring steel 10 is located in the center of the rectangular slot 15; strain gauges 9 are disposed on two faces, close to the fixed end, of the spring steel 10; the free end of the spring steel 10 is connected to a transmission head at an inner end of a transmission rod 8; the inner end of the transmission rod 8 is connected to a threaded through hole 11 on the equivalent modulus housing 7, and an outer end of the transmission rod 8 passes through the outer steel cylinder 2 and is located outside the outer steel cylinder 2; and the transmission rods 8 corresponding to two opposite faces of the cubic holder 12 are coaxial and the axial direction is the stress measurement direction.

A mounting trough 4 is formed on the outer steel cylinder 2, a transmission rod mount 6 is disposed in the mounting trough 4, the transmission rod 8 passes through the transmission rod mount 6, and an elastic sealing ring 5 is disposed between the transmission rod 8 and an inner wall of the mounting trough 4.

Figure 2:
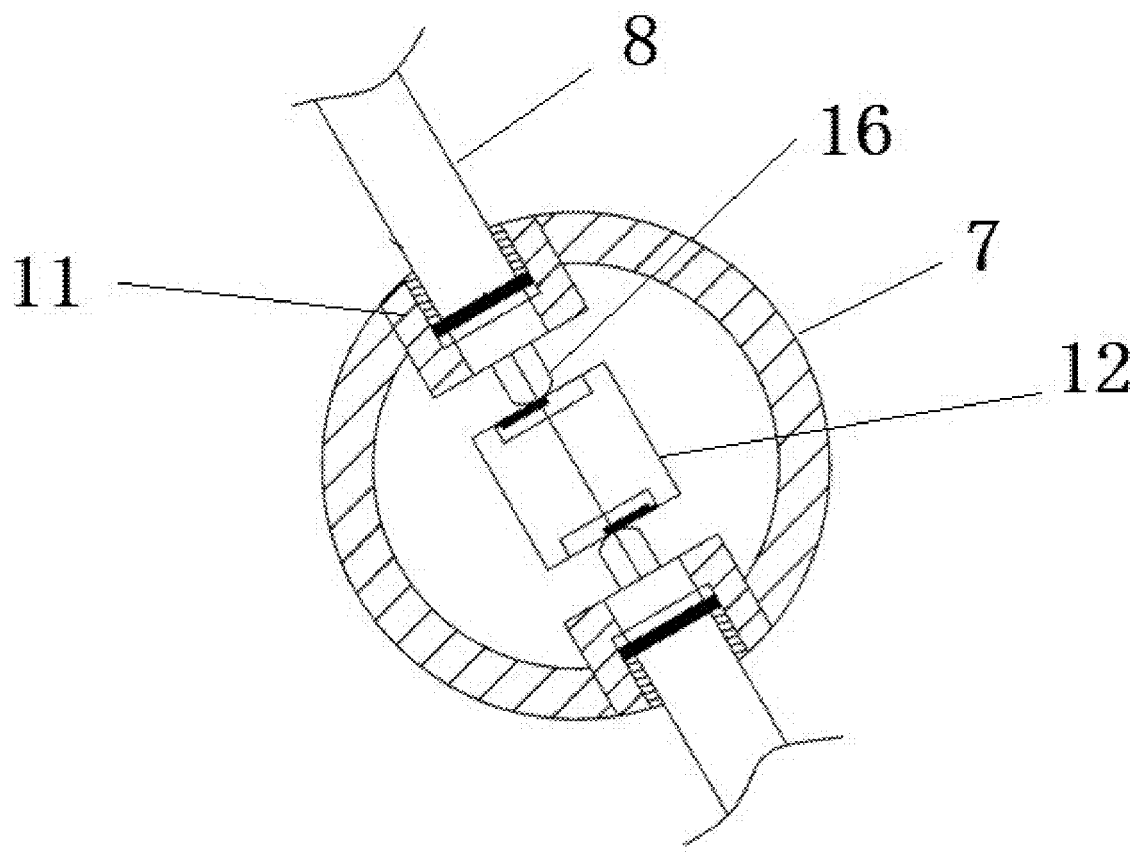
FIG. 2 is a sectional structure diagram of the three-direction sensing unit.
Figure 3:
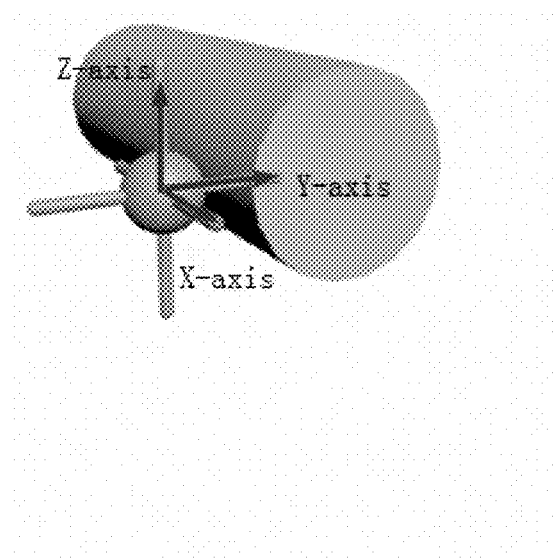
FIG. 3 is a three-dimensional reference image of the transmission rod in the basic coordinate system.
Figure 4:
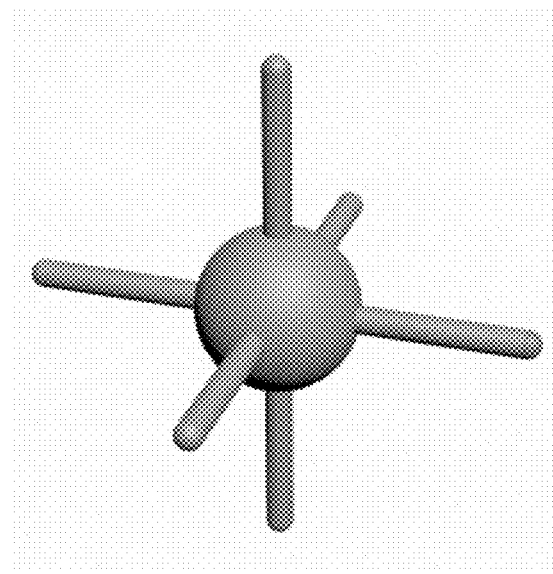
FIG. 4 is a three-dimensional view of the transmission rod after being rotated to the first transformed coordinate system.
Figure 5:
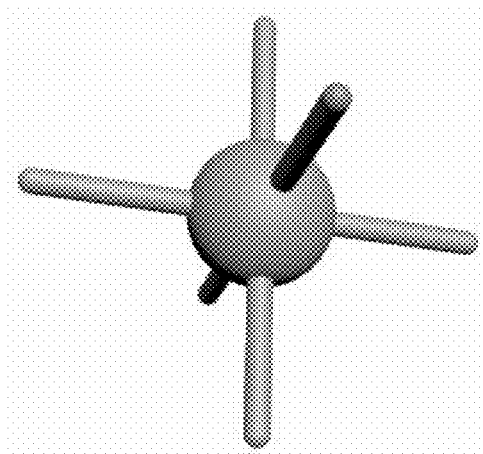
FIG. 5 is a three-dimensional view of the transmission rod after being rotated to the second transformed coordinate system.
Figure 6:
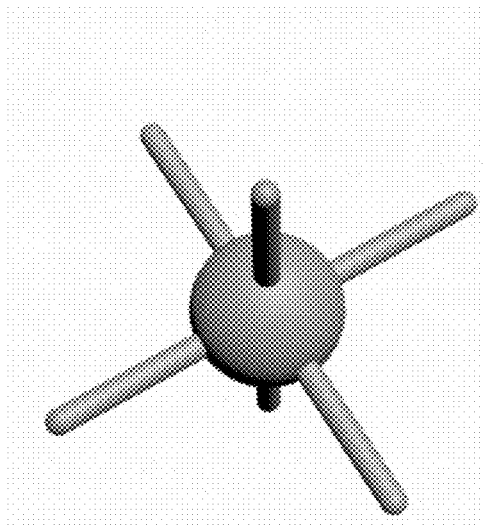
FIG. 6 is a three-dimensional view of the transmission rod after being rotated to the third transformed coordinate system.

As shown in FIG. 1 and FIG. 2, the equivalent modulus housing 7 is a spherical shell, which has a certain thickness and plays a role of stabilizing the structure and supporting the cubic holder 12. The equivalent modulus housing 7 may have different moduli of elasticity by using different materials and sizes.

The strain gauges 9 are stuck on the spring steel 10, close to the neck portion, and there is one strain gauge on each of the front and back sides. The two strain gauges may be corrected by each other, thereby preventing the damage of one of the strain gauges from influencing the result. A strain is generated as the spring steel 10 deforms. The displacement of the free end of the spring steel can be obtained from the strain obtained by the strain gauge. Given the modulus of elasticity of the spring steel and the modulus of elasticity of the equivalent modulus housing 7, a stress on the transmission rod 8, which is corresponding to the strain on the strain gauge, can be obtained. The stress-strain corresponding curves for the strain gauges in a stress measurement direction may be measured and recorded in advance.

Figure 9:
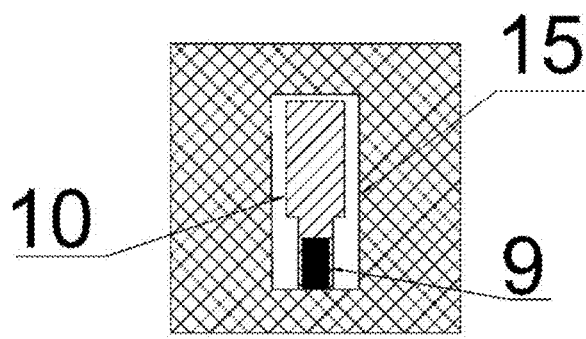

The cubic holder 12 is shown in FIG. 9. A rectangular slot 15 is formed on each of six faces of the cube. The rectangular slot has a certain depth, without running through the cubic holder (the white rectangle shown in FIG. 9), and is arranged symmetrically about the center of the cube. One end of the spring steel 10 is a fixed end and the other end thereof is a free end, with the free end being located in the center of the rectangular slot and the fixed end being fixed at the edge of the rectangular slot. Strain gauges 9 (the black portion shown in FIG. 9) are disposed on two faces, close to the fixed end, of the spring steel 10. The free end of the spring steel 10 is connected to a transmission head at an inner end of a transmission rod 8. When the outer end (i.e., the round transmission rod head 1) of the transmission rod is squeezed by rocks, the transmission rod 8 squeezes the free end of the spring steel 10 to move, and the strain gauges 9 deform to produce strain information.

A mounting trough 4 is formed on the wall of the outer steel cylinder 2. A transmission rod mount 6 is disposed in the mounting trough 4. One end of the transmission rod 8 is an inner end located inside the outer steel cylinder 2 and the other end thereof is an outer end (i.e., the round transmission rod head 1) located outside the outer steel cylinder 2. The transmission rod 8 passes through the transmission rod mount 6, and an elastic sealing ring 5 is disposed between the transmission rod 8 and the mounting trough 4. The transmission rod 8 is in flexible and sealed connection to the mounting trough 4. The elastic sealing ring 5 is sleeved on the transmission rod 8, so that the whole three-direction sensing unit is fixed inside the outer steel cylinder 2. This can avoid the injection of cement mortar into the three-direction sensing unit and also has almost no influence on the internal deformation.

A threaded through hole 11 is formed on the equivalent modulus housing 7. External threads, which are fitted with the threaded through hole 11, are provided at the inner end of the transmission rod. The inner end of the transmission rod 8 is connected to the threaded through hole 11 by the external threads. A transmission head, which is connected to the free end of the spring steel 10, is disposed at a tail end of the inner end of the transmission rod 8.

The transmission rod head 1 is hemispherical, which is convenient for mounting and stressing.

Figure 7:
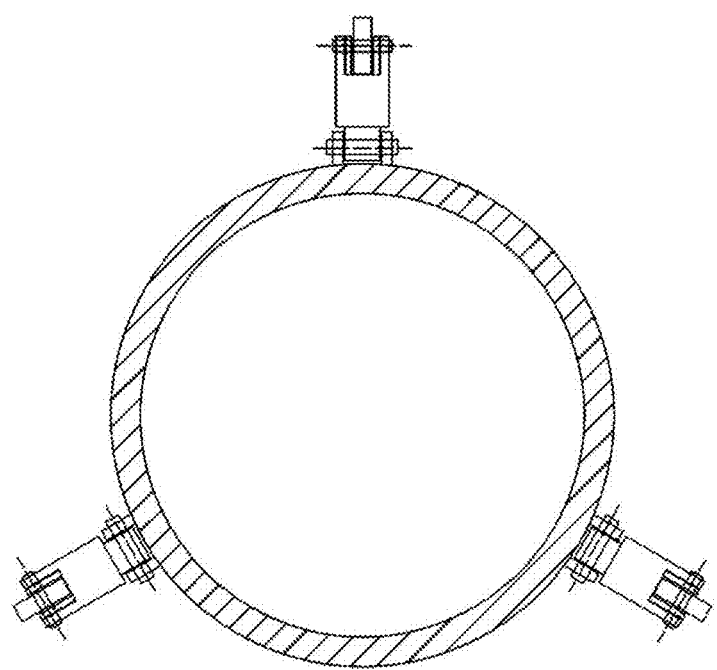
FIG. 7 is a top view of the present invention.

As shown in FIG. 1 and FIG. 7, the measurement device is cylindrical as a whole, and the transmission rod is also cylindrical. The three-direction sensing unit and the outer steel cylinder 2 are shown in FIG. 1 in which parts divided by horizontal dotted lines are actually cross-sections under different rotation angles. For ease of demonstration of the structure, all the cross-sections are shown in FIG. 1 after circumferential rotation.

The device for measuring dynamic evolution of a three-dimensional disturbed stress under mining disturbance is put in a concrete borehole and poured with cement. A confining pressure is applied to the external concrete to simulate a formation pressure environment. The confining pressure under different stress conditions is set at intervals, thus a curve of stresses on the transmission rod 8, which are corresponding to the strains on the strain gauges 9, is obtained, that is, a stress-strain corresponding curve is obtained.

The present invention discloses a method for measuring dynamic evolution of three-dimensional disturbed stress under mining disturbance, comprising steps of:

S1: establishing a basic coordinate system, the basic coordinate system having an X-axis that is an axis of the outer steel cylinder 2, and a Y-axis and a Z-axis which are perpendicular to each other and are in a plane perpendicular to the axis of the outer steel cylinder 2, the axis of the outer steel cylinder 2 being coincident with an axis of a borehole, the X-axis and the Y-axis of the basic coordinate system being in a horizontal plane;

S2: according to the right-hand screw rule, rotating the X-axis, Y-axis and Z-axis of the basic coordinate system successively by an angle $\alpha$, $\beta$ and $\gamma$ to obtain a first transformed coordinate system, with three axes of the first transformed coordinate system being defined as X'-axis, Y'-axis and Z'-axis, three stress measurement directions of the first three-direction sensing unit on the outer steel cylinder 2 being an X'-axis direction, a Y'-axis direction and a Z'-axis direction, respectively, rotating the X-axis, Y-axis and Z-axis of the basic coordinate system successively by an angle $\zeta$, $\eta$ and $\theta$ to obtain a second transformed coordinate system, with three axes of the second transformed coordinate system being defined as X"-axis, Y"-axis and Z"-axis, three stress measurement directions of the second three-direction sensing unit on the outer steel cylinder 2 being an X"-axis direction, a Y"-axis direction and a Z"-axis direction, respectively, rotating the X-axis, Y-axis and Z-axis of the basic coordinate system successively by an angle $\varphi$, $\omega$ and $\psi$ to obtain a third transformed coordinate system, with three axes of the third transformed coordinate system being defined as X'''-axis, Y'''-axis and Z'''-axis, three stress measurement directions of the third three-direction sensing unit on the outer steel cylinder 2 being an X'''-axis direction, a Y'''-axis direction and a Z'''-axis direction, respectively; and S3: obtaining, by the three three-direction sensing units on the outer steel cylinder 2, stresses in the X'-axis direction, the Y'-axis direction and the Z'-axis direction of the first transformed coordinate system, respectively denoted by $\sigma_x'$, $\sigma_y'$, $\sigma_z'$, stresses in the X"-axis direction, the Y"-axis direction and the Z"-axis direction of the second transformed coordinate system, respectively denoted by $\sigma_x''$, $\sigma_y''$, $\sigma_x''$, and stresses in the X'''-axis direction, the Y'-axis direction and the Z'-axis direction of the third transformed coordinate system, respectively denoted by $\sigma_x'''$, $\sigma_y'''$, $\sigma_x'''$, setting the stress in a basic state in the basic coordinate system as:

$$\begin{pmatrix} \sigma_x & \tau_{yx} & \tau_{zx} \\ \tau_{xy} & \sigma_y & \tau_{zy} \\ \tau_{xz} & \tau_{yz} & \sigma_z \end{pmatrix},$$

where $\tau_{yx}$ and $\tau_{xy}$ have a same value, $\tau_{zx}$ and $\tau_{xz}$ have a same value, $\tau_{zy}$ and $\tau_{yz}$ have a same value, calculating, by iteration, the stress in the basic state according to equations 1, 2 and 3, that is, calculating, by iteration, six unknown numbers by nine equations (this calculation process is well known):

$$\begin{pmatrix} \sigma'_x \\ \sigma'_y \\ \sigma'_z \end{pmatrix} = \begin{pmatrix} \cos\gamma & \sin\gamma & 0 \\ -\sin\gamma & \cos\gamma & 0 \\ 0 & 0 & 1 \end{pmatrix}$$

$$\begin{pmatrix} \cos\beta & 0 & -\sin\beta \\ 0 & 1 & 0 \\ \sin\beta & 0 & \cos\beta \end{pmatrix} \begin{pmatrix} 1 & 0 & 0 \\ 0 & \cos\alpha & \sin\alpha \\ 0 & -\sin\alpha & \cos\alpha \end{pmatrix} \begin{pmatrix} \sigma_x & \tau_{yx} & \tau_{zx} \\ \tau_{xy} & \sigma_y & \tau_{zy} \\ \tau_{xz} & \tau_{yz} & \sigma_z \end{pmatrix} \quad \text{Equation 1}$$

$$\begin{pmatrix} \sigma''_x \\ \sigma''_y \\ \sigma''_z \end{pmatrix} = \begin{pmatrix} \cos\theta & \sin\theta & 0 \\ -\sin\theta & \cos\theta & 0 \\ 0 & 0 & 1 \end{pmatrix}$$

$$\begin{pmatrix} \cos\eta & 0 & -\sin\eta \\ 0 & 1 & 0 \\ \sin\eta & 0 & \cos\eta \end{pmatrix} \begin{pmatrix} 1 & 0 & 0 \\ 0 & \cos\zeta & \sin\zeta \\ 0 & -\sin\zeta & \cos\zeta \end{pmatrix} \begin{pmatrix} \sigma_x & \tau_{yx} & \tau_{zx} \\ \tau_{xy} & \sigma_y & \tau_{zy} \\ \tau_{xz} & \tau_{yz} & \sigma_z \end{pmatrix} \quad \text{Equation 2}$$

$$\begin{pmatrix} \sigma'''_x \\ \sigma'''_y \\ \sigma'''_z \end{pmatrix} = \begin{pmatrix} \cos\varphi & \sin\varphi & 0 \\ -\sin\varphi & \cos\varphi & 0 \\ 0 & 0 & 1 \end{pmatrix}$$

$$\begin{pmatrix} \cos\omega & 0 & -\sin\omega \\ 0 & 1 & 0 \\ \sin\omega & 0 & \cos\omega \end{pmatrix} \begin{pmatrix} 1 & 0 & 0 \\ 0 & \cos\phi & \sin\phi \\ 0 & -\sin\phi & \cos\phi \end{pmatrix} \begin{pmatrix} \sigma_x & \tau_{yx} & \tau_{zx} \\ \tau_{xy} & \sigma_y & \tau_{zy} \\ \tau_{xz} & \tau_{yz} & \sigma_z \end{pmatrix} \quad \text{Equation 3}$$

S4: obtaining an equation for a principal stress, indicated by Equation 4, by setting a normal direction of a principal stress plane in the basic coordinate system as (l, m, n) and a principal stress as σ:

$(\sigma_x-\sigma)l+\tau_{yx}m+\tau_{zx}n=0$ $\tau_{xy}l+(\sigma_y-\sigma)m+\tau_{zy}n=0$ $\tau_{xz}l+\tau_{yz}m+(\sigma_z-\sigma)n=0$ \quad Equation 4 and obtaining the normal direction of the principal stress plane $l^2+m^2+n^2=1$ and the principal stress σ according to (l, m, n) and Equation 4.

In S2, rotating the X-axis, Y-axis and Z-axis of the basic coordinate system successively by an angle α, β and γ to obtain a first transformed coordinate system comprises steps of:

rotating the X-axis of the basic coordinate system for the first time, that is, by using the X-axis of the basic coordinate system as a rotation axis, with the right thumb indicating the positive direction of the X-axis of the basic coordinate system, rotating by an angle α toward a direction indicated by the remaining four fingers; rotating the Y-axis of the basic coordinate system for the first time, the X-axis of which has been rotated for the first time, that is, by using the Y-axis of the basic coordinate system as a rotation axis, with the right thumb indicating the positive direction of the Y-axis of the basic coordinate system, rotating by an angle β toward a direction indicated by the remaining four fingers; rotating the Z-axis of the basic coordinate system for the first time, the X-axis and the Y-axis of which have been rotated for the first time, that is, by using the Z-axis of the basic coordinate system as a rotation axis, with the right thumb indicating the positive direction of the Z-axis of the basic coordinate system, rotating by an angle γ toward a direction indicated by the remaining four fingers, to obtain a first transformed coordinate system;

in S2, rotating the X-axis, Y-axis and Z-axis of the basic coordinate system successively by an angle ζ, η and θ to obtain a second transformed coordinate system comprises steps of:

rotating the X-axis of the basic coordinate system for the second time, that is, by using the X-axis of the basic coordinate system as a rotation axis, with the right thumb indicating the positive direction of the X-axis of the basic coordinate system, rotating by an angle ζ toward a direction indicated by the remaining four fingers; rotating the Y-axis of the basic coordinate system for the second time, the X-axis of which has been rotated for the second time, that is, by using the Y-axis of the basic coordinate system as a rotation axis, with the right thumb indicating the positive direction of the Y-axis of the basic coordinate system, rotating by an angle η toward a direction indicated by the remaining four fingers; rotating the Z-axis of the basic coordinate system for the second time, the X-axis and the Y-axis of which have been rotated for the second time, that is, by using the Z-axis of the basic coordinate system as a rotation axis, with the right thumb indicating the positive direction of the Z-axis of the basic coordinate system, rotating by an angle θ toward a direction indicated by the remaining four fingers, to obtain a second transformed coordinate system; and in S2, rotating the X-axis, Y-axis and Z-axis of the basic coordinate system successively by an angle φ, ω and ψ to obtain a third transformed coordinate system comprises steps of:

rotating the X-axis of the basic coordinate system for the third time, that is, by using the X-axis of the basic coordinate system as a rotation axis, with the right thumb indicating the positive direction of the X-axis of the basic coordinate system, rotating by an angle φ toward a direction indicated by the remaining four fingers; rotating the Y-axis of the basic coordinate system for the third time, the X-axis of which has been rotated for the third time, that is, by using the Y-axis of the basic coordinate system as a rotation axis, with the right thumb indicating the positive direction of the Y-axis of the basic coordinate system, rotating by an angle ω toward a direction indicated by the remaining four fingers; rotating the Z-axis of the basic coordinate system for the third time, the X-axis and the Y-axis of which have been rotated for the third time, that is, by using the Z-axis of the basic coordinate system as a rotation axis, with the right thumb indicating the positive direction of the Z-axis of the basic coordinate system, rotating by an angle ψ toward a direction indicated by the remaining four fingers, to obtain a third transformed coordinate system.

Calculating stresses in the stress measurement directions of the three-direction sensing unit comprises steps of:

S3.1: measuring and recording stress-strain corresponding curves for four strain gauges in a same stress measurement direction;

S3.2: obtaining, according to strains monitored by the four strain gauges and from the stress-strain corresponding curves, corresponding stresses respectively defined as $\sigma_1$, $\sigma_2$, $\sigma_3$ and $\sigma_4$, sorting the stresses obtained by the four strain gauges from lowest to highest, $\sigma_1 \geq \sigma_2 \geq \sigma_3 \geq \sigma_4$, and, regarding bias the stress in the stress measurement directions if $\sigma_1$, $\sigma_2$, $\sigma_3$ and $\sigma_4$ are equal, otherwise, proceeding to S3.3;

S3.3: calculating an average value $\bar{\sigma}$ of $\sigma_1$, $\sigma_2$, $\sigma_3$ and $\sigma_4$, and a standard deviation s;

S3.4: calculating a difference $\bar{\sigma}-\sigma_1$ between the average value $\bar{\sigma}$ and the minimum value $\sigma_1$, and a difference $\sigma_4-\bar{\sigma}$ between the maximum value $\sigma_4$ and the average value $\bar{\sigma}$;

S3.5: determining a dubious value: comparing $\bar{\sigma}-\sigma_1$ with $\sigma_4-\bar{\sigma}$, determining $\sigma_1$ as the dubious value if $\bar{\sigma}-\sigma_1$ is greater than $\sigma_4-\bar{\sigma}$, determining $\sigma_4$ as the dubious value if $\sigma_4-\bar{\sigma}$ is greater than $\bar{\sigma}-\sigma_1$, and selecting one of $\sigma_1$ and $\sigma_4$ as the dubious value if $\sigma_4-\bar{\sigma}$ is equal to $\bar{\sigma}-\sigma_1$;

S3.6: calculating the G value of the dubious value, $G=(\text{dubious value}-\bar{\sigma})/s$;

S3.7: setting a confidence probability and obtaining a critical value from the Grubbs table according to the number of stresses in a same stress measurement direction and the confidence probability, in this embodiment, the confidence probability is set as 90%, there are four stresses in a same stress measurement direction, and a critical value 1.425 is obtained from the Grubbs table; and S3.8: comparing the G value of the dubious value and the critical value, if the G value of the dubious value is greater than the critical value, determining the dubious value as an abnormal value, eliminating the dubious value, and calculating an average value of the remaining three stresses in the same stress measurement direction to obtain the stress in this stress measurement direction, otherwise calculating an average value of the measured four stresses to obtain the stress in this stress measurement direction.

Figure 8:
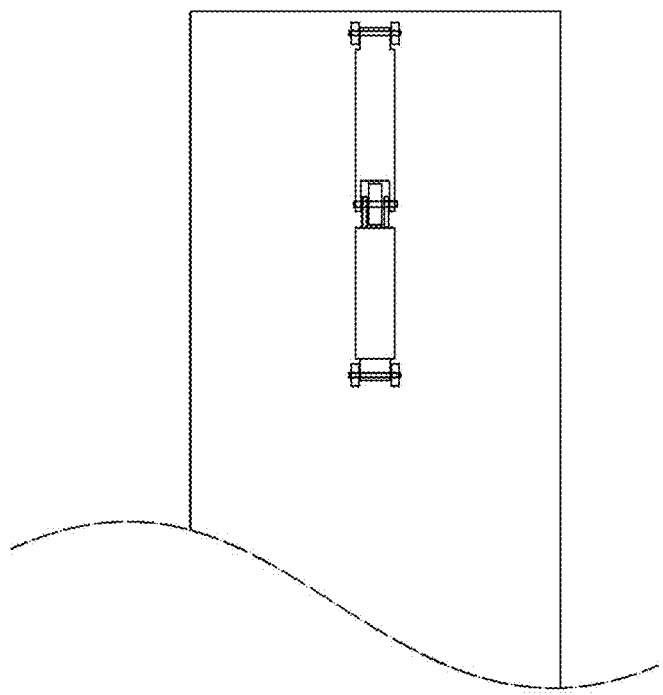
FIG. 8 is a front view of an collision prevention pulley.

As shown in FIG. 1, FIG. 7 and FIG. 8, the collision prevention pulleys 13 are arranged at the two ends of the outer steel cylinder 2, and uniformly distributed on its circumference. There are three collision prevention pulleys 13 at each end of the outer steel cylinder 2, and the three collision prevention pulleys 13 are uniformly distributed on the circumference of the outer steel cylinder 2 at 120°. When pushing the device into the borehole, the collision prevention pulleys 13 come into contact the rock wall, and this prevents the transmission rod head from colliding with the rock wall. In this way, the interference during the mounting and the influence to the three-direction sensing unit are eliminated.

The strain information measured by the strain gauge 9 is transmitted by leads from the line outlet 14 on the outer steel cylinder 2. A water-proof air interface is provided at the line outlet 14 to increase the tightness of the structure.

The specific embodiments described herein merely illustrate the spirit of the present invention. Those skilled in the art may make various modifications or supplements to the specific embodiments described herein or replace the specific embodiments described herein in a similar way, without departing from the spirit of the present invention or the scope defined by the appended claims.

What is claimed is:

1. A device for measuring dynamic evolution of a three-dimensional disturbed stress under mining disturbance, comprising a steel cylinder, wherein three three-direction sensing units are arranged on the steel cylinder, any two of three stress measurement directions of each of the three three-direction sensing units are perpendicular to each other, and nine stress measurement directions of the three three-direction sensing units are different;

the three-direction sensing unit comprises an equivalent modulus housing disposed inside the steel cylinder; a cubic holder is disposed in the center of the equivalent modulus housing; a rectangular slot is formed in the center of each face of the cubic holder, with the edge of the rectangular slot being connected to a fixed end of a spring steel; a free end of the spring steel is located in the center of the rectangular slot; strain gauges are disposed on two faces, close to the fixed end, of the spring steel; the free end of the spring steel is connected to a transmission head at an inner end of a transmission rod; the inner end of the transmission rod is connected to a threaded through hole on the equivalent modulus housing, and an outer end of the transmission rod passes through the steel cylinder and is located outside the steel cylinder; and the transmission rods corresponding to two opposite faces of the cubic holder are coaxial and the axial direction is the stress measurement direction.

2. The device for measuring dynamic evolution of a three-dimensional disturbed stress under mining disturbance according to claim 1, wherein a mounting trough is formed on the steel cylinder, a transmission rod mount is disposed in the mounting trough, the transmission rod passes through the transmission rod mount, and an elastic sealing ring is disposed between the transmission rod and an inner wall of the mounting trough.

* * * * *